W. G. LINDEMANN.
FILTER.
APPLICATION FILED FEB. 15, 1919.
1,362,998.
Patented Dec. 21, 1920.
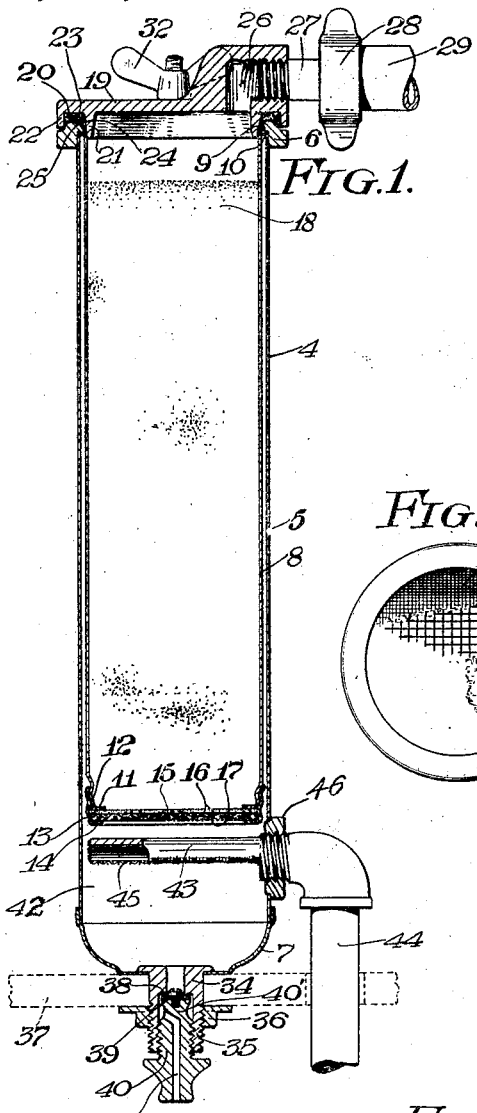
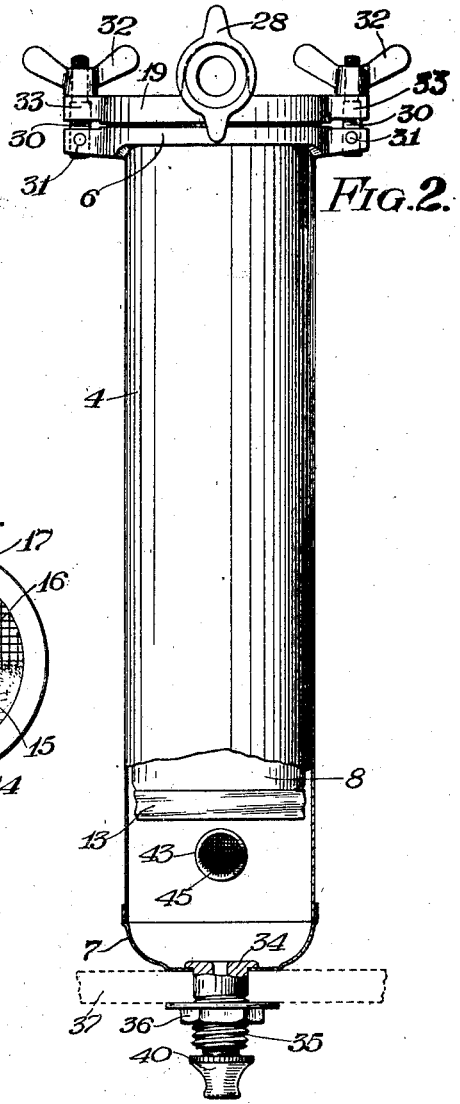
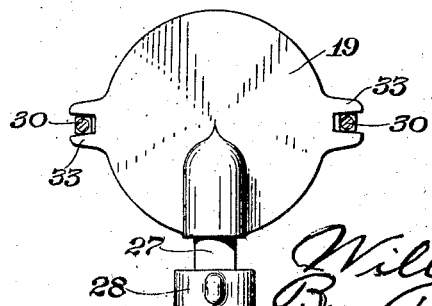
WITNESSES
C. L. Waal
H. D. Chase
INVENTOR.
William G. Lindemann
By R. S. C. Caldwell
ATTORNEY.

UNITED STATES PATENT OFFICE.

WILLIAM G. LINDEMANN, OF MILWAUKEE, WISCONSIN, ASSIGNOR TO OZONE COMPANY OF AMERICA, OF MILWAUKEE, WISCONSIN, A CORPORATION OF DELAWARE.

FILTER.

1,362,998.   Specification of Letters Patent.   Patented Dec. 21, 1920.

Application filed February 15, 1919. Serial No. 277,293.

*To all whom it may concern:*

Be it known that I, WILLIAM G. LINDEMANN, a citizen of the United States, and resident of Milwaukee, in the county of Milwaukee and State of Wisconsin, have invented new and useful Improvements in Filters, of which the following is a description, reference being had to the accompanying drawings, which are a part of this specification.

The invention relates to water filters and more particularly to a continuous flow water filter having a rapid and efficient action.

One of the objects of this invention is to produce a continuous flow filter which consists of few parts that may be easily cleaned and assembled together.

The invention further consists in the novel parts and combination of parts hereinafter described and more particularly defined by claims at the conclusion hereof.

In the drawings:

Figure 1 is a vertical sectional view through the filter embodying the invention; Fig. 2 is a side view of the filter, parts being broken away; Fig. 3 is a bottom view of the filter tube, parts being broken away; and, Fig. 4 is a top view of the cover.

Referring to the drawings, the numeral 4 designates a container having a cylindrical shell portion 5, top ring member 6, and bottom end portion 7.

A filter tube 8 is removably mounted in the container with its sides disposed close to the shell portion 5 and has an outwardly curved flange 9 which rests upon a similarly curved portion 10 of the member 6. The lower end of the tube has an inwardly extending annular flange 11 and a threaded portion 12 detachably receiving a threaded clamping ring 13 having an inwardly extending annular flange 14. Clamped between these flanges 11 and 14 is a felt pad 15, coarse screen 16, and fine screen 17. The tube itself contains fine quartz 18 or other suitable solid filtering material.

The container 4 and tube 8 are sealed at the top by means of a cover 19 and rubber gasket 20. The cover 19 has spaced apart depending flanges 21 and 22 forming an annular recess 23 in which the gasket 20 is disposed. The flange 21 has a tapered side 24 which engages the flange 9 of the tube, the gasket 20 is in contact with the curved upper edge 25 of the ring member 6 so that a tight fit is formed when said cover is clamped down upon the gasket and member 6. The cover 19 is provided with an inlet opening 26 receiving a short pipe section 27 carrying a coupling member 28 by which it may be connected to a supply pipe 29.

The cover 19 is removably secured to the container by bolts 30 pivotally connected at one of their ends to ears 31 on the member 6 and carrying wing nuts 32, said bolts being movable into position between spaced apart lugs 33 on said cover to permit the nuts 32 being screwed down upon the cover and thus clamp it to the container.

The lower end of the container is provided with a tubular fitting 34 having a threaded portion 35 receiving a nut 36 whereby the filter may be secured to a support 37 by projecting said fitting through an opening in said support and clamping the support between the end of the container and the nut 36.

The fitting 34 also forms a drain tube and is provided with a valve seat 38 coöperating with a valve 39 carried by a drain plug 40 having drain conduit 41 therein. With this construction when the plug is partly screwed down the valve 39 will be moved off its seat and the water will flow from the upper part of the fitting 34 around the recessed head 40' of the plug 40 and down through the conduit 41.

In the filter above described, the water from the supply pipe 29 flows by way of the cover 19 to the top of the tube 8 and then filters through the quartz 18, pad 15 and screens 16 and 17 into a lower chamber 42 in the container from which it is delivered through a pipe 43 to the discharge pipe 44. The pipe 43 has its end and lower open side covered with a fine mesh screen 45 so that the water after passing through the tube 8 is made to change its direction before passing to the pipe 43 through the screen 45 which is designed to remove any solid impurities, not removed by the other filter members.

With this construction the tube 8 may be readily removed for cleaning the container by removing the cover, the filtering members may be readily removed from the tube by unscrewing the ring 13, and the screened outlet pipe 43 may be readily removed from the container by unscrewing it from the threaded member 46.

From the foregoing description it will be observed that the device is simple, compact and can be readily cleaned and assembled.

What I claim as new and desire to secure by Letters Patent is:

1. In a continuous flow filter, the combination, with a container, of an imperforate tube fitting into the container and having a flanged upper end engaging the upper end of the container and a flanged lower end with a threaded portion, a cover detachably secured to the container and having an annular flange engaging the upper end of the tube and an annular recess adjacent said cover flange, packing interposed between said recess and the upper end of the container, an inlet opening in the cover, a flanged clamping ring having threaded engagement with the threaded portion of said tube, a filtering screen secured between the flange on the lower end of the tube and the flanged ring and sustaining granular filtering material in the tube, the lower end of the tube being disposed above the bottom of the container, and an outlet pipe projecting into the space between the end of the tube and the bottom of the container and having a downwardly faced screened opening.

2. In a continuous flow filter, the combination, with a container, of an imperforate tube fitting within the same and extending to near the bottom thereof, said tube having a flared upper end forming a flange engaging the upper end of the container and having a flanged lower end with a threaded portion adjacent thereto, a cover having clamping engagement with the upper end of the tube and detachably secured to the container, a flanged clamping ring having threaded engagement with the threaded portion of the tube, a filtering screen clamped between the lower flange of the tube and said ring and sustaining granular filtering material in the tube, an inlet to the tube through the cover, and an outlet from the container below the tube.

3. In a continuous flow filter, the combination, with a container, of a filtering tube detachably mounted within the container and having its lower end disposed above the bottom of the container, an outlet pipe connected to the container for ready removal and projecting into the space between the end of the tube and the bottom of the container, said pipe having a screened opening extending lengthwise thereof.

In testimony whereof, I affix my signature, in presence of two witnesses.

WILLIAM G. LINDEMANN.

Witnesses:
GERTRUDE A. SCHOENECKER,
OTTO L. LUNDGREN.